Nov. 22, 1938.  R. E. PEAK  2,137,982
DRIVEWAY RAKE
Filed Jan. 4, 1937
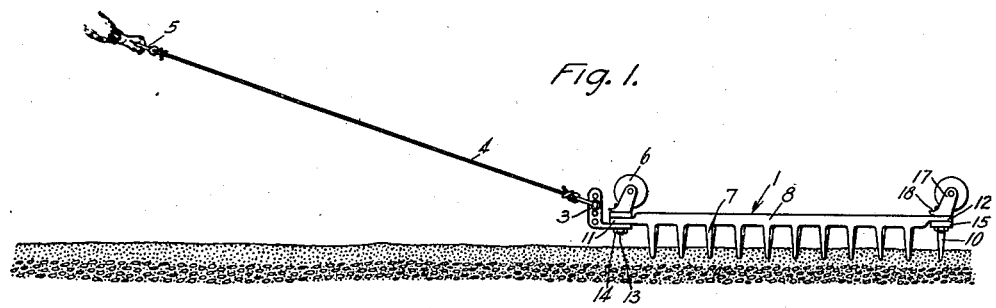
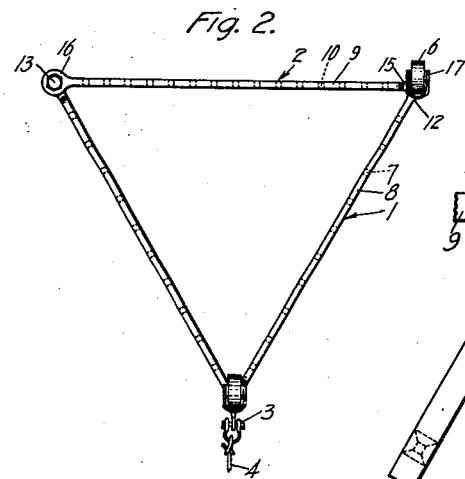
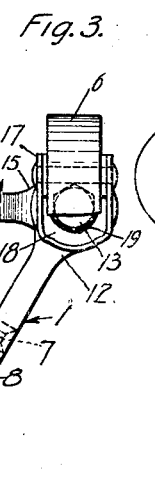
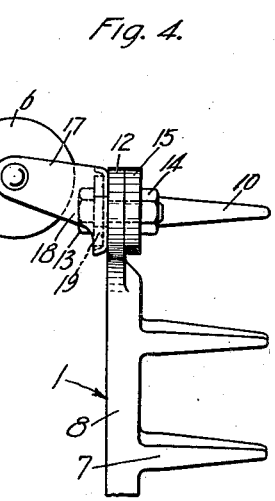
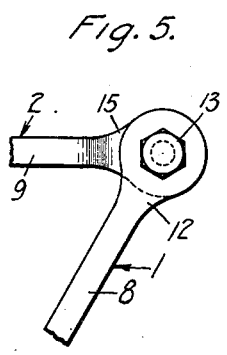
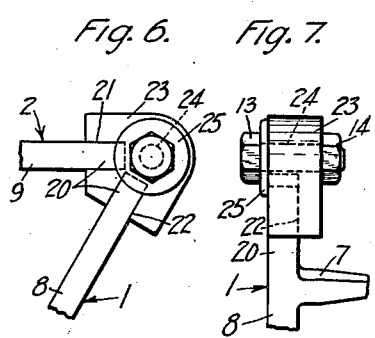
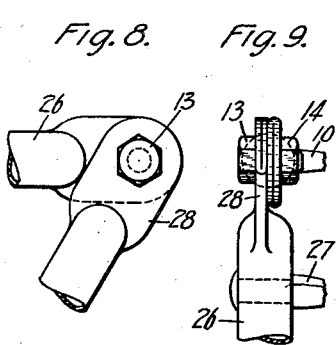
INVENTOR
Robert E. Peak
ATTORNEY Patented Nov. 22, 1938

2,137,982

UNITED STATES PATENT OFFICE 2,137,982

DRIVEWAY RAKE

Robert E. Peak, Berlin, Conn.

Application January 4, 1937, Serial No. 118,956

10 Claims. (Cl. 55—128)

My invention relates to driveway rakes.

In order to keep broken stone driveways in condition, it has heretofore been necessary to use a usual handle type hand rake. Thus, the operation of reconditioning the driveway has been a time consuming one. For example, in a filling station of average size, about three hours is required to rake the driveway and put it in proper condition with the surface stone loosened and smoothed and disposed in an attractive, workman-like manner, while in certain residence driveways, an even longer time is required, and in the larger parks, men are continuously employed keeping the driveways in condition. Further, when such work is done by hand with a hand rake, the quality of the work varies with the worker's experience. Moreover, raking stone with a hand rake for any substantial length of time is very tiring.

My invention has for its object to provide an improved driveway rake especially adapted to expedite and facilitate the raking of driveways. More particularly, it has for its object to provide an improved rake which is adapted to be quickly drawn over the driveway in such manner as very substantially to increase the area covered in a given time, while producing uniform results of improved quality at the same time that the fatigue of the user is minimized. A further object of my invention is to provide such an improved driveway rake comprising a plurality of improved rake heads combined in an improved manner and having improved means for connecting these rake heads and drawing the same when connected over the driveway, while also having improved transport means for use in transporting the rake to or from the driveway. These and other objects and advantages of my improved construction will, however, hereinafter more fully appear.

In the accompanying drawing, I have shown for purposes of illustration three embodiments which my invention may assume in practice.

In the drawing,—

Figure 1 is a side elevation of one form of my improvement in use upon a driveway, a part of the stone thereof being shown in section;

Fig. 2 is a plan view of the improved rake shown in Figure 1, the left hand rear caster being removed to facilitate illustration;

Fig. 3 is an enlarged detail plan view of the connection between adjacent rake heads, the right hand rear connection shown in Figure 2 being illustrated;

Fig. 4 is a side elevation of the structure shown in Figure 3;

Fig. 5 is a plan view similar to Figure 3 showing the structure thereof without the caster wheel shown in Figure 3;

Figures 6 and 7 are views similar to Figures 3 and 4 showing a modified construction, herein also without a caster wheel, and Figures 8 and 9 are like views showing a further modified construction, likewise without a caster wheel.

Referring first to the construction shown in Figures 1 to 4, it will be noted that I have therein illustrated a driveway rake of triangular shape comprising two side rake heads 1 and a rear rake head 2 and provided with a suitable draft connection 3 so that the same may be drawn along by hand with a rope or chain 4 having a suitable handle 5, while the teeth of the rake heads 1 and 2 engage the drive, this construction also including suitable casters 6 on the opposite face of the rake heads from the teeth so that the entire rake may be inverted and transported to or from the work on these wheels 6.

Referring more particularly to the rake heads, it will be noted that the heads 1 are each of the same construction and provided with depending teeth 7 and a weighted tooth carrying member 8. In a preferred construction, these heads 1 are, as shown, formed integral throughout and suitably cast or forged, as desired, with the teeth 7 spaced from one another by the same distance. Preferably, on these heads 1, which act as spreaders for the stone, the teeth are spaced apart by a distance of three inches, this being found to be well adapted to spread the stone effectively and prepare it for subsequent smoothing by the rake head 2, although it will be evident that the distance between the teeth may be varied, depending upon the size of the teeth and the size of the stone used in the driveway. The head 2, which is the smoothing head, is generally similar in construction to the rake heads 1 and is likewise provided with a weighted tooth carrying member 9 and teeth 10, but here these teeth 10 are disposed closer together, the same being two inches apart where three inch spacing is used on the rake heads 1, as effective smoothing and final preparation of the drive is found to be obtained by this spacing, although the latter may also be varied as brought out in connection with the teeth 7 for like reasons.

In my improved construction, the two identic spreading rake heads 1 are joined together on the front of the triangular frame formed by the rake heads, while their rear ends are connected to the rear or smoothing rake head 2. Herein it will be noted that each of the rake heads 1 is provided with oppositely disposed flat extensions 11 and 12 projecting horizontally therefrom at different levels on its opposite ends, one of which is disposed herein in the plane of the top of the weighted portion 8, while the other is disposed in the plane of the bottom thereof. Further it will be noted that these heads 1, while disposed at an angle to one another as shown in Figure 2, are also connected together reversely, i. e. with the extension 12 at the front end of one head 1 overlying the extension 11 on the other. They also are connected thereto by a suitable bolt 13 having a nut 14 under the lower extension 11, this nut 14 herein also acting to attach the draft connecting member 3. Herein also it will be noted that the rear or smoothing head 2 is provided with extensions 15 and 16 on its opposite ends generally corresponding to the extensions 11 and 12 and likewise disposed in different planes, of which the extension 15 underlies the extension 12 on the right hand member 1 while the extension 16 overlies the extension 11 on the left hand member 1. Here also it will be noted that these extensions at the rear of the rake are suitably connected by similar bolt and nut connections 13, 14. Thus it will be observed that a triangular rake is produced having the two spreading rake heads 1 connected at the front apex of the rake to the draft connection 3 and to one another and also at their rear ends to the ends of the smoothing rake head 2.

In my improved construction I also utilize the several bolt and nut connections 13, 14 as means for carrying the caster wheels 6 at the three corners of the rake thus formed. Herein a frame 17 of each caster is suitably apertured as at 18 to receive the bolt 13, and a washer 19 is disposed between the bolt head and the frame in such manner as to attach the caster frame securely to the rake frame heretofore described, while permitting free swivelling of the caster frame as desired. Thus it will be noted that my improved rake may have its weight rest on the casters 6, on which it may be readily transported to or from work, and that the rake may also be inverted whenever desired in such manner as to be supported on its spreading teeth 7 and smoothing teeth 10, as shown in Figure 1.

Here attention is particularly directed to the fact that the weight of the weighted portions 8 and 9 is carefully predetermined. This is important in order that the total weight of the rake, while causing the teeth 7 and 10 to sink to the desired depth in the small broken stone on the surface of the driveway, will not be such as to cause the teeth to dig in too deeply and thus enter the rolled base material underlying the small surface stone. In practice, the proper total weight of a rake adapted to be pulled manually over a driveway is found to be about twenty pounds. However, it will be understood that this weight may be varied to meet different conditions, and it will, of course, also be understood that where, for example, the casters 3 are omitted, the weight of the portions 8 and 9 may, if desired, be proportionately increased.

In the use of my improvement, it is possible for a driveway of an area requiring approximately three hours' work to rake with a hand rake, to be raked in from fifteen to twenty minutes. Further, the work is much more uniform, it only being necessary for the user to grasp the handle 5 and pull the rake along in order to obtain uniform results. Further, it will be evident that by changing the height of the point of connection of the rope or chain 4 to the draft connection 3, the depth of raking may be varied as desired, while obtaining uniform results in any selected setting. Moreover, with my improved driveway rake, as distinguished from the previous tiresome, long continued hand raking, the tiresome character of the driveway raking operation is quite completely eliminated, the weight of my rake being such as to impose no particular drag or load upon the user as he walks over the area dragging the rake behind him.

Referring next to the modified constructions shown in Figures 5 to 9, it will be noted that in Figure 5 I have shown a construction similar to that shown in Figures 1 to 4, but without the casters, the bolt head in this construction engaging directly on the upper surface of the extension 12. In Figures 6 and 7, I have also shown a modified construction in which, instead of providing such extensions on the adjacent ends of the different rake head members, the latter are provided with straight vertically disposed ends 20 receivable in vertically disposed slots 21, 22 in the top of a connecting member 23, herein suitably apertured at 24 to receive the bolt and a washer 25 being provided beneath the bolt head and overlying the ends of the slots 21, 22 in such manner as securely to fix the heads 1 and 2 together. Obviously, with like connecting members 23 disposed on the three corners of the rake, the latter will be held effectively together while the structure of the ends of all of the heads 1 and 2 is identical. Further, it will be noted that the process of assembling or disassembling the rake is exceedingly simple, it only being necessary to fit the ends 20 into the slots 21, 22 and then to connect the washer and bolt while, upon removal of the latter, the ends 20 may be similarly lifted out of the slots. In Figures 8 and 9 it will also be noted that the structure is essentially similar to that heretofore described in connection with Figures 1 to 4 save that the heads are formed of pipe, as indicated at 26, having teeth 27 suitably fixed therein, and flattened overlying ends 28 disposed similarly to the extensions 11, 12, 15, 16 heretofore described and adapted to be connected by a bolt and nut connection 13, 14, previously described. As a result of such a construction, it will be evident that, if desired, the teeth 27 may be replaced, if needed, or the weight readily varied as needed by filling the passages in the pipe with the required amount of any suitable weighting material, not shown, or using pipe having different wall thicknesses. While all of the constructions shown in Figures 5 to 9 have, for purposes of facilitating illustration, been shown without casters thereon, it will, of course, be understood that casters may be suitably attached thereto by the connecting bolts used in connection therewith, as previously described in connection with the structure shown in Figures 1 to 4.

As a result of my improved structure utilizing a plurality of rake heads, it is made possible to produce a wholly new rake adapted not only to obtain the results obtained by most careful hand raking, but to obtain these results much more uniformly than is possible with hand raking, and much more expeditiously and easily. Further, my improved rake is adapted to be very inexpensively manufactured, while utilizing in its preferred forms rake heads of usual hand rake type, but including my improved weighting sections and improved end structure. Further, it will be noted that two of these rake heads are of identic construction in such manner as to enable the cost of production to be thereby reduced. It will also be evident that, if desired, the rear or smoothing rake head may also have the same spacing between its teeth as the other rake heads, and thereby further reduce the cost of manufacture, although such equal spacing of the teeth on all the rake heads is not preferred, it being found that better results are obtained where the smoothing teeth are closer together than the spreading teeth. Attention is also directed to the compact form in which the parts may be shipped and to the facility with which they may be assembled. These and other advantages of my improved construction will, however, be clearly apparent to those skilled in the art.

While I have in this application specifically described several forms which my invention may assume in practice, it will be understood that these forms of the same are shown for purposes of illustration, and that the invention may be further modified without departing from its spirit or the scope of the appended claims.

What I claim as new and desire to secure by Letters Patent is:

1. A driveway rake for broken stone surfaced driveways comprising triangularly disposed operatively connected rake heads, having a draft connection at its apex, and spreading and smoothing teeth, and said rake including means out of contact with the driveway for sinking said teeth on said triangularly disposed rake heads into the light surface stone of a driveway while maintaining the same above the underlying base material of the driveway.

2. A driveway rake for broken stone surfaced driveways comprising triangularly disposed operatively connected rake heads, having a draft connection at its apex, and spreading and smoothing teeth on said triangularly disposed rake heads, said rake including means for sinking said teeth into the light surface stone of a driveway while maintaining the same above the underlying base material of the driveway, and said rake heads including side spreading heads each connected at one end to the other and to said draft connection, and a rear smoothing head connected to the rear ends of said spreading heads.

3. A driveway rake for broken stone surfaced driveways comprising triangularly disposed operatively connected rake heads, having a draft connection at its apex, and spreading and smoothing teeth on said triangularly disposed rake heads, said rake heads including means for sinking said teeth into the light surface stone of a driveway while maintaining the same above the underlying base material of the driveway, and said heads including side spreading and rear smoothing heads and the teeth on said heads being uniformly spaced and those on said spreading heads being spaced by a distance greater than the distance between the teeth on said smoothing head.

4. A driveway rake comprising triangularly disposed operatively connected rake heads, having a draft connection at its apex, and spreading and smoothing teeth, said rake heads also including means for sinking said teeth into the light surface stone of a driveway while maintaining the same above the underlying base material of the driveway, and casters carried at the corners of said triangularly disposed rake heads on the opposite face thereof from said teeth including wheels rotatably mounted on said casters and free to swivel across said heads.

5. A driveway rake including triangularly disposed rake heads having spreading and smoothing teeth, caster wheels carried at the corners of said triangularly disposed rake heads on the opposite face thereof from said teeth, and means for connecting together the adjacent ends of the rake heads and for connecting said caster wheels to said corners.

6. A triangular driveway rake having teeth, and means for sinking said teeth into the light surface stone of a driveway while maintaining the same above the underlying base material of the driveway, and comprising side spreading toothed rake heads having oppositely disposed extensions at different levels at their opposite ends and different extensions overlapping at one apex, a rear smoothing rake head having like extensions at its opposite ends engaging different extensions at different levels on different side heads, and means carried by said extensions for connecting said heads into triangular form.

7. A triangular driveway rake having teeth, and means for sinking said teeth into the light surface stone of a driveway while maintaining the same above the underlying base material of the driveway, and comprising side spreading toothed rake heads having oppositely disposed extensions at different levels at their opposite ends and different extensions overlapping at one apex, a rear smoothing rake head having like extensions at its opposite ends engaging different extensions at different levels on different side heads, and means carried by said extensions for connecting said heads into triangular form, said side rake heads being of identic construction and reversely disposed and the teeth on said smoothing head being uniformly spaced and closer together than the teeth on said spreading heads.

8. A triangular driveway rake having teeth, and means for sinking said teeth into the light surface stone of a driveway while maintaining the same above the underlying base material of the driveway, and comprising side spreading toothed rake heads having oppositely disposed extensions at different levels at their opposite ends and different extensions overlapping at one apex, a rear smoothing rake head having like extensions at its opposite ends engaging different extensions at different levels on different side heads, means carried by said extensions for connecting said heads into triangular form, and a flexible draft connection connected to both side heads by the same means connecting said heads together at said apex.

9. A driveway rake of triangular form having teeth, and means for sinking said teeth into the light surface stone of a driveway while maintaining the same above the underlying base material of the driveway, and comprising spreading and smoothing toothed rake heads each having extensions on its ends, slotted connecting members at the corners receiving said extensions, and means on said connecting members for retaining said extensions in the slots in said members.

10. A driveway rake of triangular form having teeth, and means for sinking said teeth into the light surface stone of a driveway while maintaining the same above the underlying base material of the driveway, comprising spreading and smoothing toothed rake heads each including a tubular tooth carrying portion and flattened extensions on its opposite ends, and means cooperating with said flattened extensions for connecting said heads into triangular form.

ROBERT E. PEAK.